Jan. 20, 1970 R. V. RELSTED 3,491,209

LIGHT PULSE OPERATED SWITCHING DEVICE AND NETWORK

Filed June 24, 1965 5 Sheets-Sheet 1

INVENTOR.
RICHARD V. RELSTED
BY Hane and Nydick
ATTORNEYS

Jan. 20, 1970 R. V. RELSTED 3,491,209

LIGHT PULSE OPERATED SWITCHING DEVICE AND NETWORK

Filed June 24, 1965 5 Sheets-Sheet 2

INVENTOR.
RICHARD V. RELSTED
BY Kane and Wydeck
ATTORNEYS

Jan. 20, 1970 R. V. RELSTED 3,491,209

LIGHT PULSE OPERATED SWITCHING DEVICE AND NETWORK

Filed June 24, 1965 5 Sheets-Sheet 3

INVENTOR.
RICHARD V. RELSTED
BY Hane and Nydick
ATTORNEYS

LIGHT PULSE OPERATED SWITCHING DEVICE AND NETWORK

Filed June 24, 1965 5 Sheets-Sheet 4

INVENTOR.
RICHARD V. RELSTED
BY Hane and Nydick
ATTORNEYS

INVENTOR.
RICHARD V. RELSTED
BY Hane and Nydick
ATTORNEYS

United States Patent Office 3,491,209
Patented Jan. 20, 1970

3,491,209

LIGHT PULSE OPERATED SWITCHING DEVICE AND NETWORK

Richard Vagn Relsted, Horhavevej 82, Hojbjerg, Arhus, Denmark

Filed June 24, 1965, Ser. No. 466,663
Claims priority, application Denmark, July 15, 1964, 3,521/64
Int. Cl. H04m 3/00
U.S. Cl. 179—18 3 Claims

ABSTRACT OF THE DISCLOSURE

A switching element in the form of contact element cooperated with a controllably energizable light pulse emitter. The contact element includes a two-terminal bistable semiconductor device which is switchable between high and low impedance states. The semiconductor device is switched to the low impedance when irradiated by light while a voltage is applied across its terminals, and remains in this state as long as current flows through the device. When the current is interrupted the device reverts to the high impedance state. The switching element is shown incorporated in switching matrices as well as switching networks for telecommunication systems.

Figure 1:
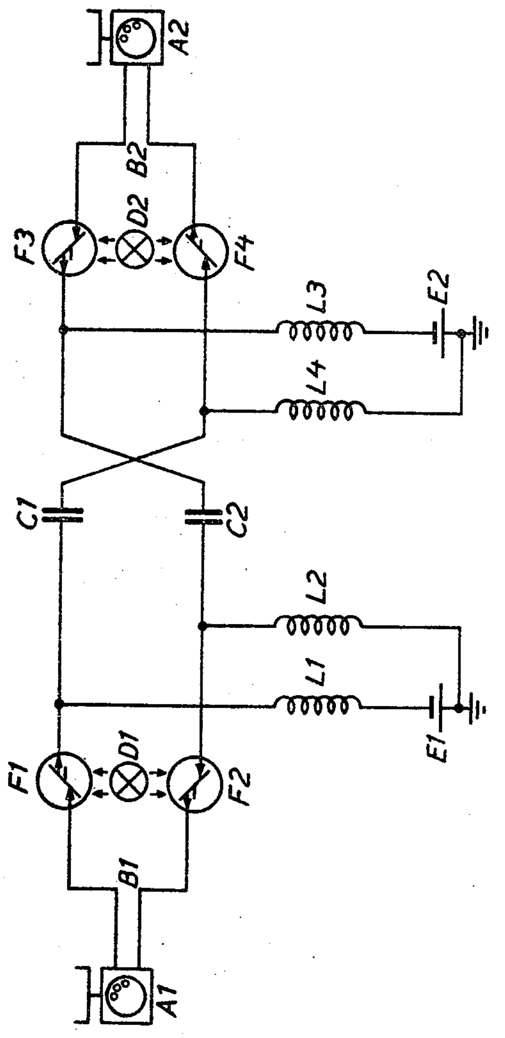

This invention relates to electronic switching networks and particularly to switching arrangements which are functionally similar to electromechanical devices as used in crossbar telephone and Telex exchanges.

Exchanges of the type described herein are capable of extending connections through a network of cross points for establishing speed paths between subscribers. To allow many simultaneous connections, these exchanges usually comprise a series of cascaded matrices having contacts or contact elements in each cross point.

Recent development in the semiconductor field suggest the use of semiconductors as contacts in the switching network, e.g., pnpn semiconductors. However, until now all electronic switching devices such as cold cathode tubes, diodes, transistors and thyristors have generally been discarded because they all have a direct electrical connection between the trigger and the switching electrodes, resulting in no electrical isolation between the control equipment and the switching network. One-wire switching networks with transformers for each subscriber line and a complicated control equipment together with problems to get satisfactory transmission quality have made such systems too complicated and expensive and very few experimental systems are in commercial use. Furthermore, photo resistors have been proposed as switching devices in telecommunication switching systems; the photo resistors being illuminated by a light source to obtain the low resistance conducting state. Such contact elements have also been discarded due to a too high resistance of the contact in the conducting state, too long switching time of the contact for telephone switching purpose and a rather high power consumption of the light sources during the holding time of the contacts.

Accordingly, an object of this invention is to provide new and improved electronic switching arrangements for telecommunication switching systems.

Briefly, the invention contemplates the use of electronic switching devices controlled by light pulses in automatic telephone and Telex exchanges. The contact elements used are bistable light activated semiconductors, e.g., pnpn photo diodes or photo thyristors which are activated to a low resistance conducting state when exposed to a voltage and simultaneously to a light pulse of sufficient energy from a light source optically coupled to said contact element, e.g., a light emitting diode or another corresponding electromagnetic radiation pulse. The element remains in the low resistance conducting state as long as a holding current of sufficient magnitude passes therethrough, and is brought to a non-conducting state, when the holding current is interrupted.

It is an object of another aspect of the invention to provide cross points for telecommunication switching systems having the contact conductors and the control network activating the contacts electrically separated from each other.

This is done by using light pulse activation of the contacts.

An object of another aspect of the invention is to provide switching devices having two or more contacts controlled by the same light pulse. This is done by optically coupling one light source to two or more light activated bistable semiconductors. In consequence of this, and contrary to what is normally the case with pnpn switching networks using other pnpn elements and other activating methods, the use of such switching device results in rather uncomplicated control of two-wire switching.

Electronic switching devices according to the invention can be interconnected to form an electronic cross point switch for use in telecommunication switching systems by arranging the contact elements in a matrix with one or more wires. For each wire of the switch a contact is provided in each of the cross points of the matrix. A current source is provided for each of the circuits connected to the outlets. Light emitters are optically coupled to each cross point of the matrix, the emitters being electrically connected in a light emitter matrix, electrically isolated from the contact matrix, but having a geometric design analogous to the contact matrix. An arbitrary light emitter may be activated to emit a light pulse whereby the contact or contacts optically coupled to the light emitter activates to a low resistance conducting state and connects electrically the inlet and the outlet of the contact matrix in the cross point where it is located.

For use in automatic telephone exchanges the contacts can be held in the low resistance conducting state of the battery which supplies the current for the microphone of the subscribers subset. By use of this method, an aspect of the invention, the holding and disconnecting of contacts in an electrical communication channel is controlled directly by the off-hook and on-hook condition of the subscriber's handset. This means there is no need for the normally used control circuit to disconnect the contacts, when the handset is placed on the hook.

An object of another aspect of this invention is to provide cross point switches having one or two wires and a minimum number of light emitting diodes to activate the cross points thereby simplifying the production and the control of the cross point switch.

An object of another aspect of this invention is to provide an electronic telephone switching network comprising a series of cascaded contact matrices for interconnecting subscriber lines and control circuits and to provide new and simple means for setting up connections through this network without electrical connection between the contact network and the control.

Another object of this invention is to provide simple means of activating the light emitters that control the setup of connections in a multistage contact network.

Taking into consideration all aspects of the invention it will be understood that electronic telephone exchanges according to this invention will be rather simple with respect to control arrangements, more robust, less bulky, less current consuming, more rapidly switching, and more suited for integrated production than any existing telephone exchange system. The advantages mentioned, make switching systems according to the invention specially adequate for use in air and space vehicles and for military uses.

The above mentioned and other objects and features of this invention and the manner of obtaining them will become more apparent, and the invention itself will be better understood by reference to the following description of an embodiment of the invention taken in conjunction with the accompanying drawings. It is to be understood, however, that the drawings are for the purpose of illustration only and are not a definition of the limits of the invention, reference being made to the claims for this purpose.

Figure 2:
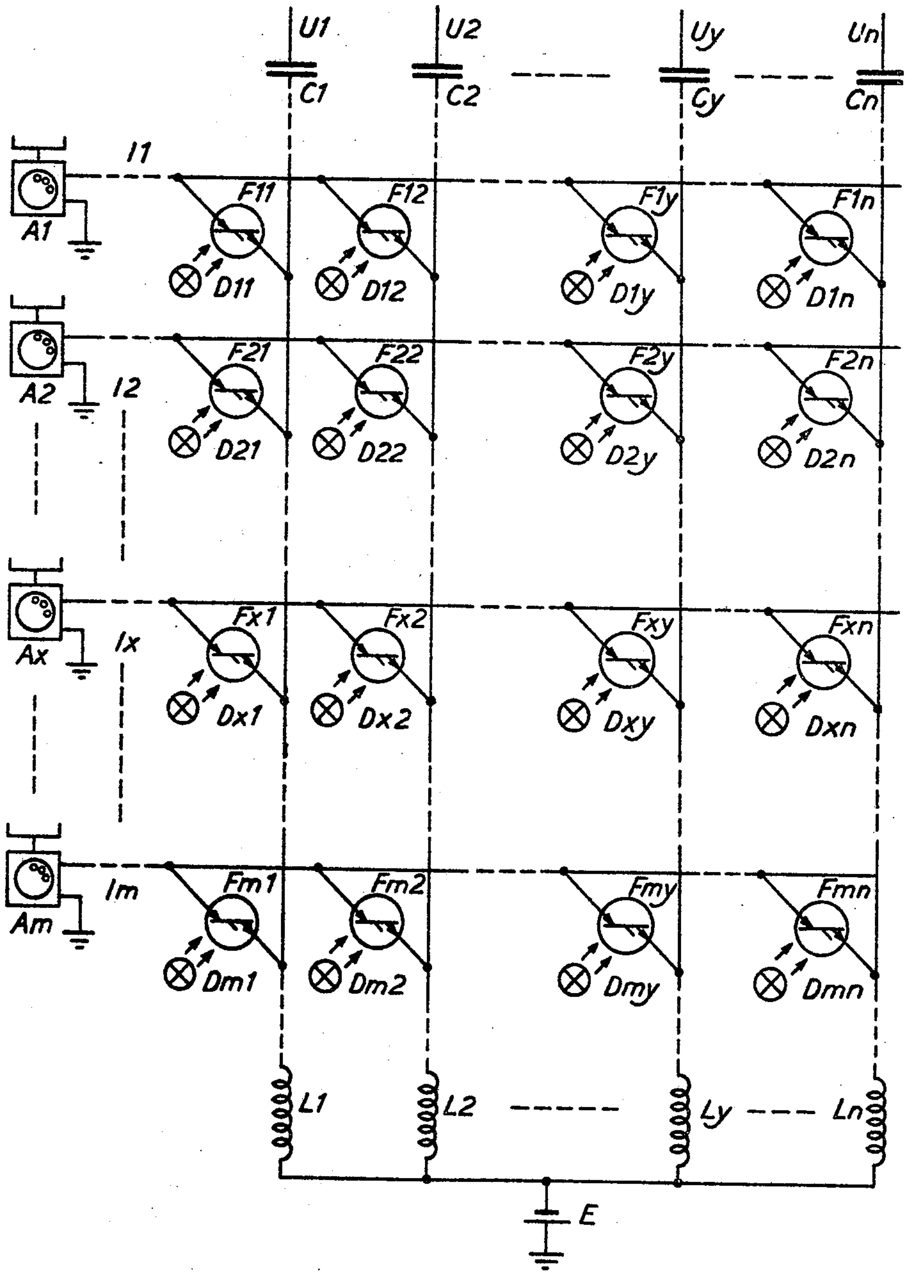
Figure 3:
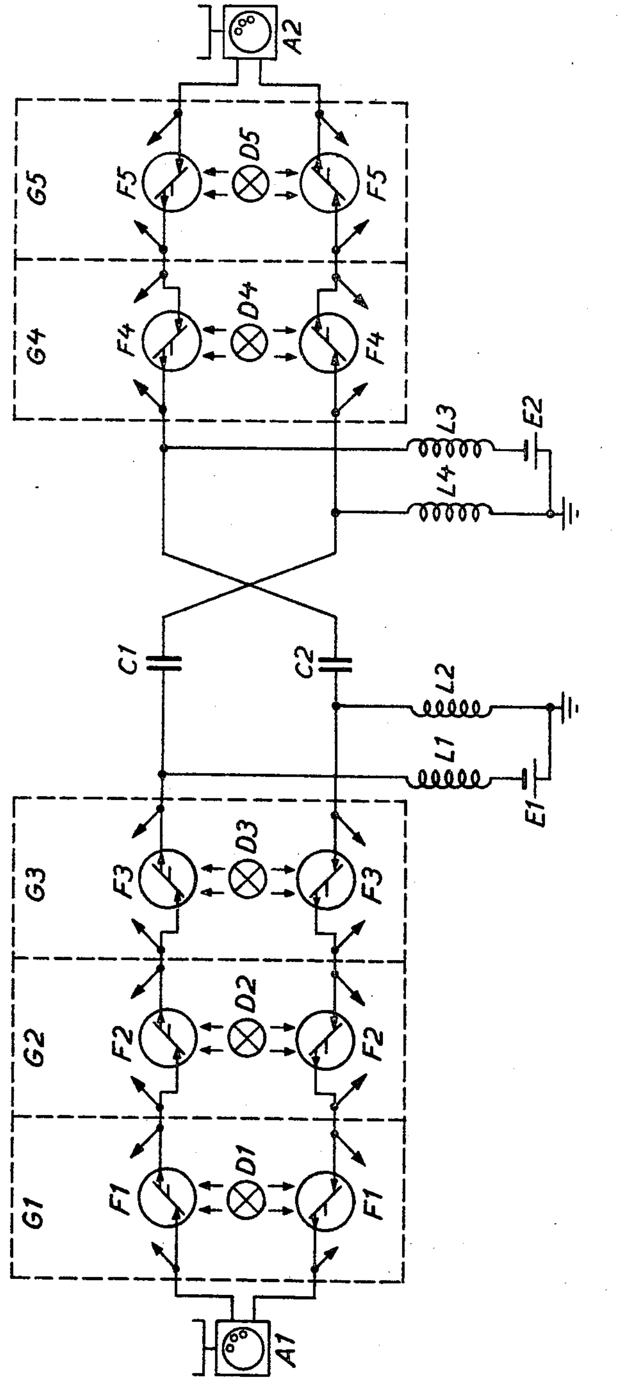
Figure 4:
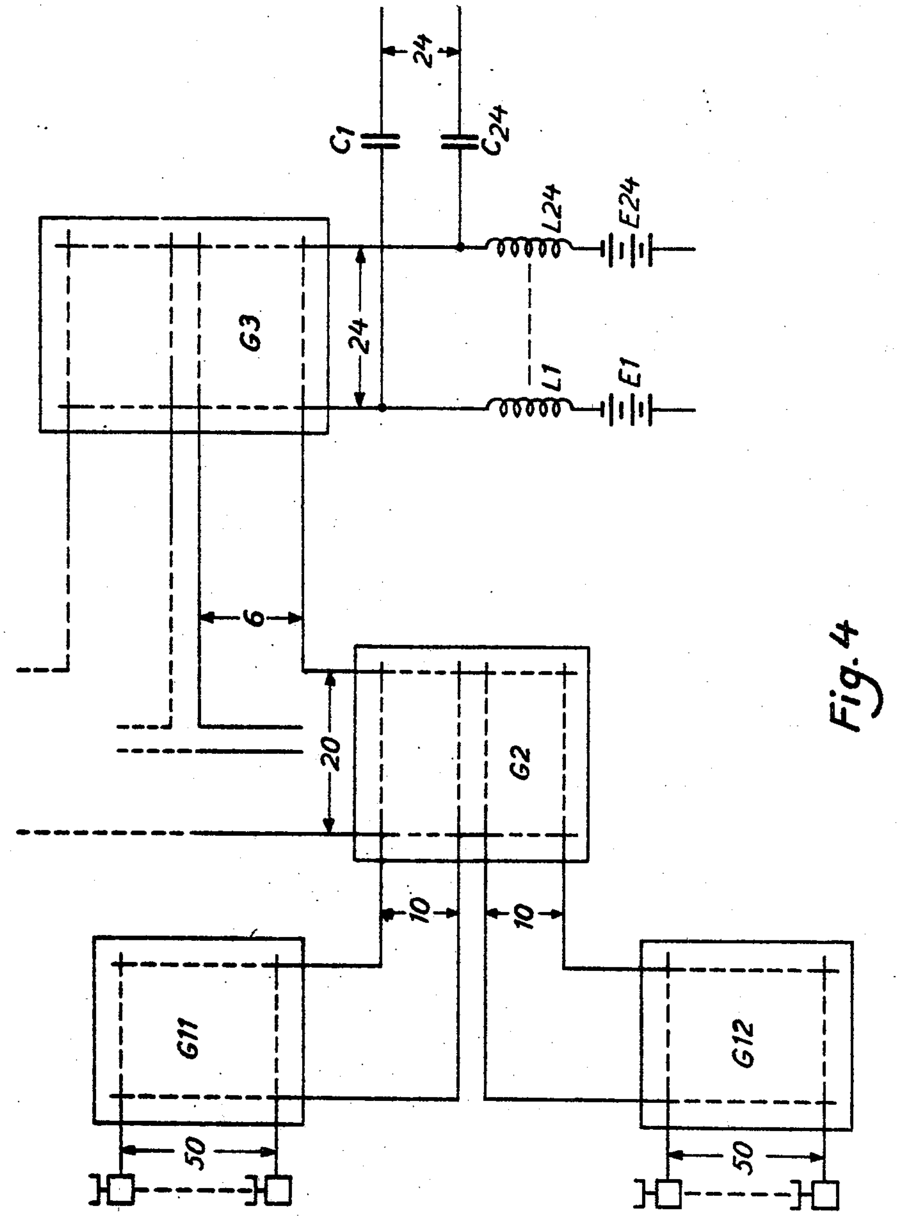
Figure 5:
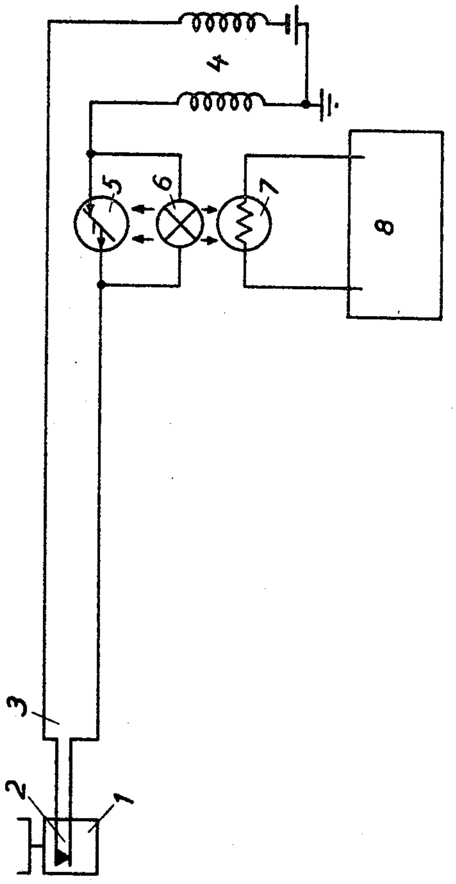

In the drawings:

FIG. 1 is a speech path between two subscriber sets utilizing switching devices according to the invention, FIG. 2 shows a cross point switch arrangement utilizing switching devices according to the invention, FIG. 3 shows a diagram for setting up a connection between calling and called subscriber in a multistage network using switching devices and cross point switches utilizing the invention, FIG. 4 is a block diagram showing an exemplary switching exchange utilizing the invention, and FIG. 5 shows an embodiment wherein the invention is incorporated in a dial pulse receiver.

(1) THE INVENTION USED AS A SELECTOR CONTACT FOR THE TRANSMISSION OF SPEECH CURRENTS BETWEEN TWO TELEPHONE STATIONS

FIG. 1 shows two telephone sets A1 and A2 interconnected through photo contacts according to the invention. B1 and B2 are the subscriber's lines. F1, F2 and F3, F4 are bistable light activated semiconductor contacts. E1 and E2 are current sources; L1, L2 and L3, L4 are coils; these current sources and coils constituting a commonly used feeding current arrangement for CB-telephone exchanges.

C1 and C2 are capacitors for transmitting of speech currents between the telephones A1 and A2.

D1 and D2 are light emitters for activating of the semiconductors F1, F2 and F3, F4.

If a communication is to be established between the telephone sets A1 and A2, the two handsets are lifted and the loop is closed. When the light emitter D1 gives a light pulse—a light flash—the photo contacts F1 and F2 are activated and current can pass from the current source E1 through the coil L2, the semiconductor contact F2 and the line B1 to the telephone set A1 and back over the line B1, the semiconductor contact F1, and the coil L1 to the current source E1. In the same way current from source E2 will, after a light pulse from light emitter D2, pass from source E2, coil L4, semiconductor F4, line B2, set A2, semiconductor F3 and coil L3 to source E2. Speech in the microphone of the telephone set A1 will modulate the direct current in the left hand part of FIG. 1 with an alternating current corresponding to the speech. The AC-components of the modulated direct current will pass through the capacitors C1 and C2 and modulate the direct current in the right hand part of FIG. 1 so that the speech will be heard in the receiver of the telephone set A2.

As long as the telephone handsets are raised the semiconductors, because of their known physical properties, will allow the passage of direct current. When the handsets are restored the direct current through the telephone sets is suspended and the connection at the semi-conductor contact is interrupted. If the handset is lifted again a direct current will not flow through the semiconductors contact until it is activated again by a light pulse.

In summary, the principle of the use of photo contacts for switching purposes is that a D.C. voltage is applied to the photo contact and that the same is activated by a light flash and furthermore that the photo contact is maintained closed as long as it passes direct current and opens when the current is interrupted.

(2) METHOD ACCORDING TO THE INVENTION FOR THE BUILDING UP OF A SELECTOR WITH *m* INLETS AND *n* OUTLETS

In FIG. 2 elements A1, A2 . . . A*m* are a number of telephone sets each one with one terminal connected to ground and the other terminal to the inlets I1 . . . I*m* in a single pole selector.

The selector is designed in such a way that the *m* inlets together with the *n* outlets U1 . . . U*n* form a coordinate net, a so-called matrix, whose crossing points are connected by the photo contacts F11, F12 . . . F1*n*, F21, F22 . . . F*mn*, all together $m \cdot n$ contacts. Each outlet is furthermore connected through a coil to a grounded direct current source E, and in each outlet a capacitor is provided for the transmission of speech currents.

Electrical light emitters D11 . . . D*mn* are optically connected to photo contacts F11, etc., respectively. The light emitters may be activated by a control equipment (not shown) for the emitting of light impulses. The light emitters may be assembled in a light emitter matrix, electrically separated from the selector contacts but designed in analogy therewith.

There will now be described how an arbitrary inlet *x* may be connected to an arbitrary outlet *y* in the following way.

The handset of the telephone set A*x* is lifted and the light emitter D*xy* activated, whereby the contact F*xy* is activated and closes. The inlet *x* will be connected to the outlet as long as the direct current through the contact F*xy* is not interrupted, for instance, by the replacing of the handset of the telephone set A*x*. It is understood that the selector with the same number of light emitters may be designed as a two- or multi-pole selector.

It is furthermore understood that the light pulse activating may be carried out by $m+n$ light emitters, each one activating a column or a row of the matrix, and which are so dimensioned that no light emitter alone can activate the selector contact, but that a simultaneous activating by two emitters, the one corresponding to the *m*-emitters and the other to the *n*-emitters, by coincidence will give sufficient light energy for activating of the selector contact corresponding to the coordinate crossing point.

Referring to FIG. 2 the following possibilities of reducing the number of light emitters are obvious.

It is possible to use the *m*-emitters only with one emitter for each inlet as is understood from the following reasoning;

Suppose that in FIG. 2 only one communication link is established, for instance that the telephone set A*x* is connected to outlet U*y* and furthermore that the handset of telephone set A*m* is lifted and a light emitter D*m* of the row *m* is activated.

Because of the voltage drop across the coil L*y*, caused by the feeding current of the telephone set A*x*, the voltage applied to the photo contact F*my* is lower than what is required for the activation of this contact F*my* to connect set A*m* to the outlet U*y* which is already occupied. Instead, one of the other photo contacts F*m*1 . . . F*mn* will be activated, because it is known that, by a correct dimensioning of a plurality of parallel circuits containing bistable contacts, one and only one of a plurality of possible circuits may be connected.

The number of the emitters may also be reduced to *n* emitters, one for each outlet, as is understood from the following reasoning:

Suppose again that the telephone set A*x* is connected to outlet U*y* and that the handset of telephone set A*m* is lifted and that the light emitter D*n* corresponding to the column *n* is activated. Nothing will happen to the selector contacts of telephone sets, which have their handsets restored, because direct current is not applied to the corresponding selector contacts.

Furthermore, nothing will happen with the selector contact F*xn*, not withstanding that the handset of the telephone set A*x* is lifted because set A*x* is already connected to outlet $U_y$ through contact $F_{xy}$. Only the telephone set $A_m$, which has its handset lifted, will, under the given circumstances, be connected through the contact $F_{mn}$ to the outlet $U_n$.

From this reasoning it is understood that under certain circumstances, for instance when the system allows selection with free hunting over a number of $n$-outlets, it is sufficient with a common light emitter, that by the use of a light conductors is connected to all contacts in the selector and that it can be achieved that in all cases the marked inlet becomes connected to one and only one—although an arbitrary one—of the free outlets.

(3) METHOD OF ESTABLISHING A CONNECTION THROUGH SEVERAL SELECTOR STEPS

A switching arrangement may be built from a number of selector stages composed of selectors according to the description of FIG. 2.

FIG. 3 shows the establishment of the connection over five selector stages in which the telephone sets A1 and A2 are connected together via the selector stages G1, G2, G3 and G4, G5.

The different selectors are built up with use of selectors of the same principle as in FIG. 2 but in a double pole design. In FIG. 3 only those contacts, which enter in the speech circuit, are shown in each selector.

The current feeding arrangement includes the current sources E1 and E2 together with coils L1, L2 and L3, L4. C1 and C2 are capacitors for the transmission of speech currents. D1–D5 are light sources in the selection stages G1–G5, which activate the right contact pair F1–F5 for establishing of a speech circuit between telephone sets A1–A2.

With the handsets of telephone sets A1 and A2 lifted the connection is established through selector stages G1, G2 and G3 by simultaneous activation of light emitters D1, D2 and D3 and through selector stages G4 and G5 by simultaneous activation of light emitters D4 and D5. The connection is maintained as long as both handsets are lifted and is disconnected on the sides of sets A1 and A2, respectively, by the restoring of the handsets of A1 and A2.

FIG. 3 shows only one of several possible free connection channels between sets A1 and A2.

(4) METHOD OF GOVERNING THE ESTABLISHMENT OF A CONNECTION THROUGH A PLURALITY OF SELECTOR STAGES

FIG. 4 is a block diagram showing an exemplary telephone system utilizing a network of electronic cross points according to the invention.

These cross points are distributed over two cascaded stages of four matrices—cross-point switches 11–14. The matrices 11–12 in the first stage are marked "primary" and the matrices 13–14 of the second stage are marked "secondary."

The matrices are interconnected in any suitable switching pattern with a few exemplary patterns here shown. Every cross point in a primary matrix has access to at least one input of the secondary matrix. To the inputs of the primary matrix are connected subscriber lines 15 and 16 and to the output of the secondary matrix are connected registers 17, incoming and outgoing trunks 18 and intra office trunks 19.

To the subscribed circuits are connected a calling line detector, here exemplified as a scanner 20. A marker 21 is connected to the scanner, the registers, the control equipment of the trunks and to the light emitters of the matrices. Furthermore, it has control devices which makes the marker the operator of the switching system.

The system operates in the following manner: A calling subscriber line 15 requests service and lifts the handset off its hook. The scanner 20 connects its line to the marker 21. The marker identifies the calling subscriber line and finds an idle register 17.

The marker 21 now, by activating relevant light pulse emitters, connects a path from the calling line 15 through the primary and the secondary stage to register 17, which supplies current to hold the connection through the matrices 11 and 13.

The register returns the dial tone to the calling subscriber line 15 and the subscriber dials the wanted number.

Local call

If, for example, the calling subscriber on line 15 dials subscriber line 16 this information is transmitted from the register to marker 21 and the register disconnects by interrupting the direct current of the path.

The marker now finds a path from the called line 16 through the primary and the secondary stage to connect with the $b$-side of an intra office trunk 19. It connects the $a$-side of this trunk through the secondary and the primary stages to the calling line 15. There are direct current sources in both $a$- and $b$-side of the intra office trunk. The marker 21 by flashing the light sources optically coupled to the relevant contacts in the contact matrices of the primary and the secondary establishes a path between the calling subscriber line 15 and the called subscriber line 16. The intra office trunk transmits ringing current to subscriber line 16. When subscriber at line 16 lifts the handset off his set a speech path is established between subscriber lines 15 and 16.

Outgoing call

The register transmits the information of the called destination to the marker 21 as received from calling subscriber line 15. The marker finds an idle outgoing trunk to the distant office, connects the calling subscriber line through the primary and the secondary stage to this trunk which has a direct current source to supply the holding current to hold the connection to subscriber line 15. The marker 21 transmits the necessary digit information to the distant office which establishes connection to the called subscriber.

Termination of call

Upon termination of the conversation the handsets are placed on hooks. The subset currents are disconnected and the contacts of the speech path are disconnected and will be available for new calls.

(5) DEVICE ACCORDING TO THE INVENTION FOR THE RECEIVING OF DIAL PULSES IN AN AUTOMATIC TELEPHONE EXCHANGE

In FIG. 5 reference numeral 1 is a telephone set, 2 is a contact in the dial of the telephone set, which interrupts a number of times corresponding to the digit taken on the dial; 3 is the subscriber's line; 4 is the current feeding arrangement of the line, described in connection with FIG. 1. Photo contact 5 is located in the connector circuit for a subscriber's line 3 in the register. A light emitter 6, for instance an incandescent lamp is connected in parallel with the photo contact 5 eventually by means of a transistor, and photo resistor 7 is connected under voltage in the counter circuit of a register 8, arranged in the known way.

The impulse transmission from the dial contact to the counter circuit of the register occurs in the following way:

Provided the dial contact 2 is open, the photo contact 5 is also open. When the dial contact 2 closes, the light emitter 6 is ignited and activates the photo contact 5 and simultaneously the photo resistor 7 so that its resistance becomes low. When the photo contact 5 is activated, the lamp 6 is turned out, the resistance of the photo resistor 7 becomes high and so on. In other words by means of the photo resistor a number of pulses, corresponding to the number of closures of the dial contact, are transmitted to the counter circuit of the register.

I claim:

1. An electronic cross-point switching system comprising: a group of $m$ input signal conductors and a group of $n$ output signal conductors intersecting at $m \times n$ cross points; a plurality of bistable semiconductor devices each having a pair of terminals, each of said semiconductor devices being switchable from a high impedance state to a low impedance state when irradiated by a light pulse while a DC voltage is applied across said pair of terminals and thereafter remaining in said low impedance state as long as a DC current passes through said semiconductor device, and each one of said semiconductor devices being disposed at one of said cross points; means of connecting one terminal of each of said semiconductor devices to one of said input signal conductors, respectively; means for connecting the other terminal of each of said semiconductor devices to one of said output signal conductors, respectively; a plurality of means for switchably generating a DC voltage and a DC current, each being connected to at least one input signal conductor and to at least one output signal conductor; a plurality of means for superimposing an AC current on a DC current, each being connected to a different one of said input signal conductors as a source of input signals; a plurality of signal processing devices, each of said signal processing devices being connected to one of said signal conductors; a first plurality of $m$ selectively operable light pulse sources, each being associated with a different one of said $m$ input signal conductors wherein each one of said $m$ light pulses sources is optically coupled to all the semiconductor devices connected to its associated input signal conductor; and a second plurality of $n$ selectively operable light pulse sources, each being associated with a different one of said $n$ output signal conductors, wherein each of said $n$ light pulse sources is optically coupled to all the semiconductor devices connected to its associated output signal conductor so that each semiconductor device is optically coupled to one of said $m$ light pulse sources and also to one of said $n$ light pulse sources, the amplitude of the light pulses from the light pulse sources being such that only coincident light pulses, one from each of the two light pulse sources to which an arbitrary semiconductor device is optically coupled can switch said device to the low impedance state when a DC voltage is applied across the terminals thereof.

2. A switching network employing a plurality of systems according to claim 1 wherein the cross-point switching systems are connected in cascade and further including a common source of electrical energy for said means for generating the DC voltages and DC currents.

3. An electronic cross-point switching system comprising: a group of $m$ input signal conductors and a group of $n$ output signal conductors intersecting at $m \times n$ cross points; a plurality of bistable semiconductor devices each having a pair terminals, each of said semiconductor devices being switchable from a high impedance state to a low impedance state when irradiated by a light pulse while a DC voltage is applied across said pair of terminals and thereafter remaining in said low impedance state as long as a DC current passes through said semiconductor device, and each one of said semiconductor devices being disposed at one of said cross points; means of connecting one terminal of each of said semiconductor devices to one of said input signal conductors, respectively; means for connecting the other terminal of each of said semiconductor devices to one of said output signal conductors, respectively; a plurality of means for switchably generating a DC voltage and a DC current, each being connected to at least one input signal conductor and to at least one output signal conductor; a plurality of means for superimposing an AC current on a DC current, each being connected to a different one of said input signal conductors as a source of input signals; a plurality of signal processing devices, each of said signal processing devices being connected to one of said signal conductors; a plurality of light pulse sources, each one of said light pulse sources being associated with one of the signal conductors of only one of the groups of signal conductors, and wherein each of said light pulse sources is optically coupled to each of the semiconductor devices connected to its associated signal conductor, and means for switchably applying said DC voltage across and DC current through selected ones of said semiconductor devices.

References Cited

UNITED STATES PATENTS

| | | | |
|---|---|---|---|
| 2,599,368 | 6/1952 | Bruce et al. | |
| 3,201,764 | 8/1965 | Parker | 340—166 XR |
| 3,321,745 | 5/1967 | Mansuetto et al. | 340—166 |
| 3,341,692 | 9/1967 | Lee. | |
| 3,078,373 | 2/1963 | Witteberg. | |
| 3,304,430 | 2/1967 | Biard et al. | 307—311 |
| 3,366,793 | 1/1968 | Svedberg. | |
| 3,370,174 | 2/1968 | Toussaint. | |

OTHER REFERENCES

E. Keith Howel: Electronics Magazine, May 4, 1964, vol. 37, No. 15, pp. 53–61

KATHLEEN H. CLAFFY, Primary Examiner

W. A. HELVESTINE, Assistant Examiner

U.S. Cl XR.

340—166